US008885928B2

(12) United States Patent
Forman (10) Patent No.: US 8,885,928 B2
(45) Date of Patent: Nov. 11, 2014

(54) AUTOMATED MACHINE-LEARNING CLASSIFICATION USING FEATURE SCALING

(75) Inventor: George Henry Forman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1276 days.

(21) Appl. No.: 11/552,968

(22) Filed: Oct. 25, 2006

(65) Prior Publication Data

US 2008/0101689 A1     May 1, 2008

(51) Int. Cl.
*G06K 9/62* (2006.01)
(52) U.S. Cl.
CPC ..................................... *G06K 9/623* (2013.01)
USPC .......................................... 382/159; 382/155
(58) Field of Classification Search
CPC ... G06K 9/00456; G06K 9/60; G06K 9/6256; G06K 9/6282; G06K 9/6257; G06K 9/6267; G06K 9/46; G06T 2207/20081; G06T 2207/20076; G06T 2207/20084
USPC ............ 382/155, 161; 706/12, 44; 700/47, 48
See application file for complete search history.

(56) References Cited

U.S. PATENT DOCUMENTS

| | | | | |
|---|---|---|---|---|
| 5,444,796 A | * | 8/1995 | Ornstein | 382/157 |
| 5,708,727 A | * | 1/1998 | Tanaka et al. | 382/156 |
| 2004/0059697 A1 | * | 3/2004 | Forman | 706/46 |

OTHER PUBLICATIONS

G. Forman "An Extensive Empirical Study of Feature Selection Metrics for Text Classification". Special Issue on Variable and Feature Selection, Journal of Machine Learning Research, 3(Mar):1289-1305, 2003.
Dharmendra Modha, Scott Spangler, "Feature Weighting in k-Means Clustering" (2002). Machine Learning.
Dietrich Wettschereck, David W. Aha and Takao Mohri, "A Review and Empirical Evaluation of Feature Weighting Methods for a Class of Lazy Learning Algorithms". Artificial Intelligence Review. vol. 11, Nos. 1-5 / Feb. 1997.

* cited by examiner

*Primary Examiner* — Edward Park (57) ABSTRACT

Provided are systems, methods and techniques for machine-learning classification. In one representative embodiment, an item having values for a plurality of different features in a feature set is obtained, together with scores for the different features. The score for a given feature is a measure of prediction ability for that feature and was calculated as a function of a plurality of different occurrence metrics of the feature. The values for the features are scaled according to the scores for the features, and the item is classified by inputting the adjusted feature set values for the item into a previously trained classifier.

18 Claims, 3 Drawing Sheets

AUTOMATED MACHINE-LEARNING CLASSIFICATION USING FEATURE SCALING

FIELD OF THE INVENTION

The present invention pertains to systems, methods and techniques for classifying any of a variety of different types of items, and particularly is applicable to automated classification using machine-learning techniques.

BACKGROUND

A great deal of attention has been given to automated machine-learning techniques. One area of study focuses on automated classification of input items. For example, as the volume of digital data has exploded in recent years, there is significant demand for techniques to organize and sort such data in a manner that allows it to be useful for a specified purpose.

Automated classification of digital information has application in a number of different practical situations, including image recognition (e.g., identifying which photographs from among thousands or millions in a database include a picture of a face or a picture of a particular face), text classification (e.g., determining whether a particular e-mail message is spam based on its textual content), and the like.

Various approaches to automated classification problems have been attempted. These approaches include supervised techniques, such as Support Vector Machine (SVM) and Naïve Bayes, as well as unsupervised techniques, such as clustering algorithms. However, each such conventional technique has its own limitations, and additional improvements in performance are always desired.

DESCRIPTION OF THE PREFERRED EMBODIMENT(S)

The present invention primarily applies to the classes of supervised and semi-supervised techniques for machine learning. However, it also may be applied to unsupervised machine-learning techniques.

Generally speaking, both supervised and semi-supervised machine-learning techniques use a set of labeled training samples for the purpose of training a classifier. In supervised machine learning, all of the training samples have had labels correctly identified for them, while in semi-supervised machine learning at least some of the training samples have labels that have not been fully verified. In any event, the resulting classifier is then used to classify items having unknown labels.

Generally speaking, the label for a training sample or other item (sometimes referred to herein as the "ground truth label") represents the specific category (hard label) into which the specific item should be placed (usually as determined by a human evaluation). However, in certain embodiments the labels represent category scores, indicating how well the items fit into particular categories.

Some of the conventional literature regarding machine-learning classification techniques pertains to the problem of binary classification, as in information filtering, e.g. separating spam from valid email. Other work addresses multi-class classification, e.g. routing or classifying a document into one of many categories. Most of the examples in the present disclosure pertain to binary classification, which can be considered to be a subproblem in many multi-class classification methods. That is, many multi-class classification techniques (with the notable exception of some decision trees) can be performed by decomposing the 1-of-n problem, pitting each class against the others. Similarly, the problem n-of-m multi-class classification, e.g. topic recognition, can be addressed by applying m independent binary classifiers to each item.

Figure 1:
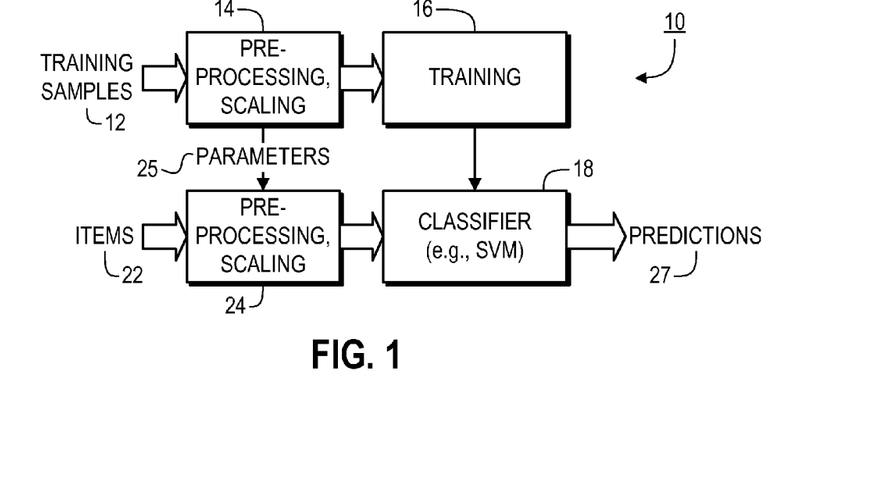
FIG. 1 is a block diagram of an automated classification system according to a representative embodiment of the present invention.
Figure 2:
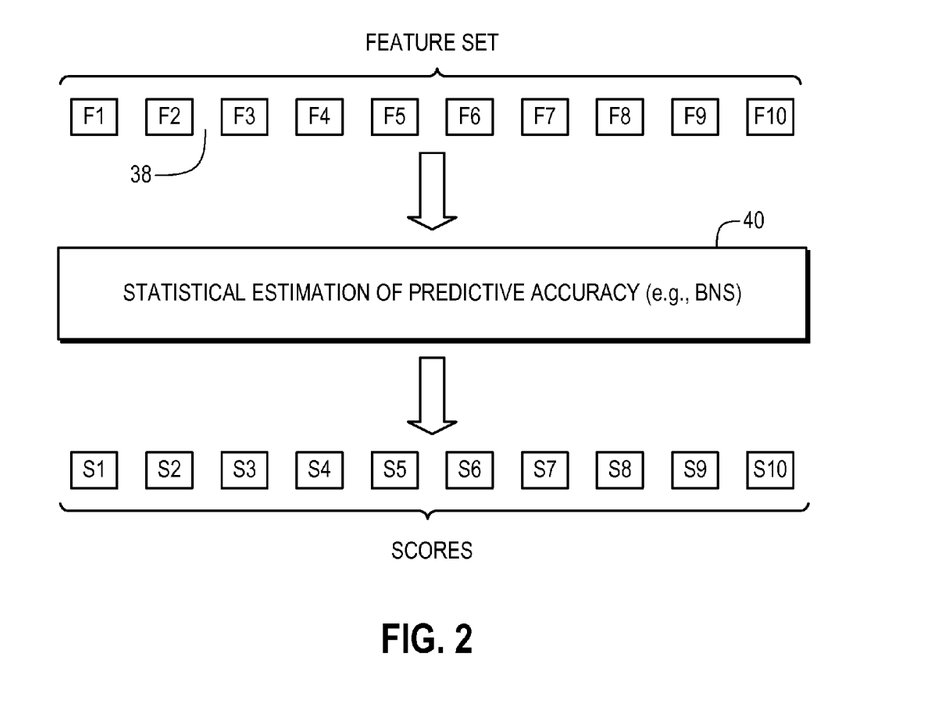
FIG. 2 is a block diagram illustrating how scores are generated for a set of features according to a representative embodiment of the present invention.

FIG. 1 is a block diagram of an automated classification system 10 according to a representative embodiment of the present invention. As shown in FIG. 1, a number of training samples 12 initially are input into a pre-processing section 14. Each of the training samples preferably is represented by values for features in a designated feature set. An example is feature set 38 (shown in FIG. 2), which consists of a plurality of features F1-F10. Although only 10 features (F1-F10) are shown in FIG. 2, it should be understood that this is for ease of illustration only. In most embodiments, many more features will be utilized, such as tens, hundreds or thousands of features.

Depending upon the particular embodiment, the feature set being used either was predetermined (as preferably is the case with static data) or has been determined on-the-fly (as preferably is the case with data that vary over time or otherwise vary from one set to another). In any event, the feature set preferably includes a set of variables that is believed to be adequate to sufficiently characterize the expected input items for purposes of the classification task at hand. For example, for purposes of classifying an input e-mail message to determine whether the message is spam or non-spam, the feature set in one embodiment of the invention pertains to a list of words, with each the data field for each feature (i.e., word in this example) intended to hold a binary value indicating whether the word is present in the e-mail message. In alternate embodiments, the feature set accommodates entry of an integer number for each word, indicating the number of occurrences of the word in the e-mail message. Various techniques for selecting a feature set, with the particular technique typically depending upon the particular classification problem, are discussed in the conventional literature.

It often will be the case that the number of features included in the original feature set is over-inclusive, e.g., including some features that are not very predictive of the desired classification category. There are several reasons that this situation can occur. First, one often wants to increase the likelihood that the feature set is able to adequately characterize the input items, and at the outset it sometimes is not possible to know which features will prove to be most predictive, so it often is better to err on the side of over-inclusion. In addition, in order to minimize processing requirements, the same feature set sometimes will be generated and used for multiple different purposes, so the resulting feature set has some features that are not particularly appropriate for the specific task at hand.

Pre-processing section 14 pre-processes the feature sets of the training samples 12. Ordinarily, pre-processing section 14 is implemented entirely in software. However, in alternate embodiments it is implemented in any of the other ways discussed below.

One potential type of processing performed by pre-processing section 14 is feature selection, i.e., selecting only those features that are most predictive for use in classifying new items. One example of feature selection is described in co-pending U.S. patent application Ser. No. 10/253,041, filed Sep. 24, 2002, and titled "Feature Selection For Two-Class Classification Systems" (the '041 Application), which is incorporated by reference herein as though set forth herein in full.

However, experiments have shown that the best results often are obtained when using feature scaling according to the present invention across all features in the original feature set. Accordingly, in the preferred embodiments of the invention all of the features are used (i.e., no feature selection). However, in the event feature selection is used in conjunction with the techniques of the present invention, and based solely on the limited experimentation performed to date, the currently preferred embodiments employ a different scoring technique for feature selection (e.g., Information Gain, as discussed in more detail below) than is used for feature scaling (e.g., BNS, as discussed in more detail below).

Notwithstanding the preceding paragraph, in certain cases it might be desirable to use feature selection. One example is where processing time is a factor in reducing the number of features reduces processing time. Another example, involving a somewhat different type of feature selection, is where a sample size is sufficiently small such that at least one of the estimations of the underlying statistics for a particular feature (e.g., one of the occurrence metrics, described below) is deemed unreliable. In this case, it might be desirable to eliminate the subject feature in certain embodiments of the invention.

In any event, following pre-processing section 14, the training samples 12 and/or their preferably modified feature sets 38 are input into training section 16, together with ground truth labels for at least some of the training samples 12. In the preferred embodiments of the invention, training section 16 implements Support Vector Machine (SVM) training in order to output its classifier 18. However, in alternate embodiments training section 16 uses a Naïve Bayes training technique or any other preferably supervised or semi-supervised training technique to produce classifier 18. Training section 16 and the resulting classifier 18 preferably are implemented entirely in software, but instead may be implemented in any of the other way as discussed below.

Once classifier 18 has been generated, it can be used to classify unlabeled items 22. Each such item 22 is input into a pre-processing section 24 that preferably performs processing that is identical or at least substantially similar to that of pre-processing section 14. One significant difference between pre-processing section 14 and pre-processing section 24 is that certain processing parameters 25 (e.g., feature scores, as discussed in more detail below) preferably are generated in pre-processing section 14 and provided for use by pre-processing section 24. In any event, pre-processing section 24 preferably performs scaling, e.g., using any of the techniques described below. Classifier 18 then operates on the modified feature set output from pre-processing section 24 to provide output predictions 27 of the underlying ground truth labels for the subject items 22.

The resulting predictions 27 are then used, e.g., for any desired useful purpose. Examples include: redirecting spam e-mail to a separate folder; automatic categorization, indexing or filing of text articles or other documents; automatically retrieving requested items from a large database; or the like.

As indicated above, one aspect of the present invention is feature scaling prior to use of a feature set for training and/or classification purposes. In the preferred embodiments of the invention, such scaling is performed by the first generating scores for the various features. A high-level block diagram of this process is illustrated in FIG. 2. Specifically, data for the feature set 38 (either the entire original feature set or that portion remaining after any feature selection in pre-processing section 14 or 24) is input into module 40 for statistically estimating the prediction ability of the individual features F1-F10 and outputting corresponding scores S1-S10.

The particular data values that are input for the features F1-F10 preferably are taken from the training samples 12 that are used to train classifier 18. However, other data values may be used in addition (or instead). In certain embodiments, the score for each of the individual features F1-F10 is based on data values not only for the subject feature, but also for others of the features F1-F10. However, in the preferred embodiments each score for a particular one of the features F1-F10 is based only on data values for that particular feature relative to the ground truth classification labels, e.g., across the entire set of training samples 12.

Figure 3:
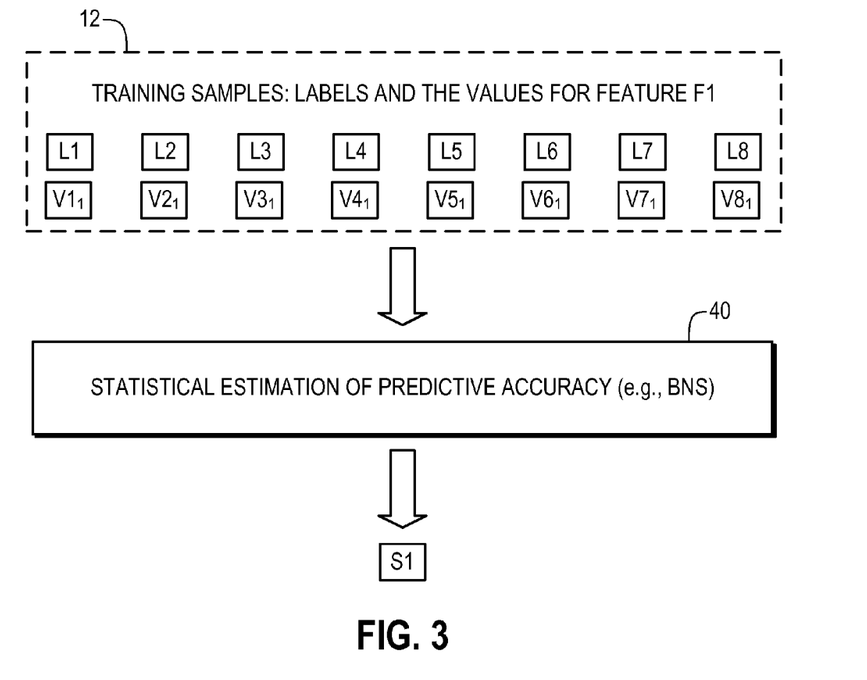
FIG. 3 is a block diagram illustrating how an individual score is generated for a single feature according to a representative embodiment of the present invention.

This latter approach is illustrated in FIG. 3 which shows the calculation of score S1 for feature F1, according to the preferred embodiments of the present invention. As shown, only the data values $V1_1$-$V1_8$ (for feature F1) and ground truth classification labels L1-L8, for eight training samples are input into module 40. It is noted that, solely for the purpose of ease of the illustration, only eight training samples are used. In actual practice, there typically will be many more training samples, e.g., more than 20, 100, 1000 or even 10,000 training samples.

According to the different embodiments of the invention, any of a variety of different scoring techniques is used by module 40. However, in the preferred embodiments module 40 scores each feature using a score defined as follows:

$$S=|aF^{-1}(tpr)-bF^{-1}(fpr)|,$$

where:

$F^{-1}$ is an inverse probability distribution function (in the present embodiment, the standard Normal cumulative probability distribution function), true positive rate tpr=P(feature|positive class)=tp/pos, false positive rate fpr=P(feature|negative class)=fp/neg, pos=number of positive training cases, neg=number of negative training cases, tp=number of positive training cases containing the subject feature, fp=number of negative training cases containing the subject feature, and a and b are constants.

When $F^{-1}$ is the inverse standard Normal cumulative probability distribution function, the score S corresponds to the Bi-Normal Separation (BNS) score introduced by the present inventor in the '041 Application. If a and b are equal, then the score is "non-weighted". On the other hand, if a and b are unequal the score is "weighted", providing greater weight to features that are positively correlated with the classification if a>b and greater weight to features that are negatively correlated with the classification if a<b.

In the '041 Application, the BNS score is used for feature selection, typically by retaining the features having the highest BNS scores and disregarding the ones with the lowest BNS scores for classification purposes. In the present techniques, as discussed in more detail below, the BNS scores preferably are used for feature scaling.

It is noted that the foregoing definition of the BNS score generally is well-defined only for a binary feature (e.g., a feature indicating whether a particular word appears in the subject article or other item at least one time). However, as indicated above, binary features can be used in a wide variety of contexts, as general feature types can generate a variety of Boolean features, e.g. comparing a numeric feature to a threshold. Also, the particular score used in the inventive techniques can be adjusted to accommodate each individual classification problem.

In that regard, although a specific definition is given for the BNS, that definition should be as he understood as being exemplary only. The present invention in fact contemplates the use of more generalized scoring functions.

First, it is noted that the BNS score evaluates two different occurrence metrics for the subject feature, i.e., the true positive rate and the false positive rate. In alternate embodiments of the invention, more than two different occurrence metrics are utilized. In addition, different kinds of occurrence metrics are used in different embodiments, e.g., different functions of the true positive rate and/or the false positive rate, other counts of proper classification and improper classification based on a given feature, and/or other counts indicating the strength of the correlation between the feature value to the ground truth classification label, as well as any combination of the foregoing.

Also, in the BNS score the occurrence metrics are evaluated in relation to an assumed probability distribution, i.e., preferably the standard Normal cumulative probability distribution function. However, in alternate embodiments the assumed probability distribution function is any desired probability distribution function (e.g., binomial distribution). In still further embodiments, the measures of feature occurrence are evaluated in relation and to a generalized function that is not explicitly identified as a probability distribution function.

The BNS score takes the absolute value of the simple difference between the inverse probability distribution functions of the tpr and the fpr. However, this should be understood as merely exemplary, with the general approach being to calculate an indication of the separation between the measures of prediction ability. For example, in alternate embodiments the separation is calculated using a different function of the difference (e.g., the square), using a ratio of the individual occurrence metrics (or functions of such measures), any combination of the foregoing, or in any other manner.

In still further embodiments of the invention, entirely different scores instead are used. One example is Information Gain, which is defined as:

$IG$=entropy(pos,neg)−($P$(word)entropy($tp,fp$)+(1−$P$(word))entropy($fn,tn$)), where $fn$=pos−$tp$, $tn$=neg−$fp$, entropy($x,y$)=−$nln$($x/(x+y)$)−$nln$($y/(x+y)$), and $nln$($x$)=$x$ log$_2 x$.

Figure 4:
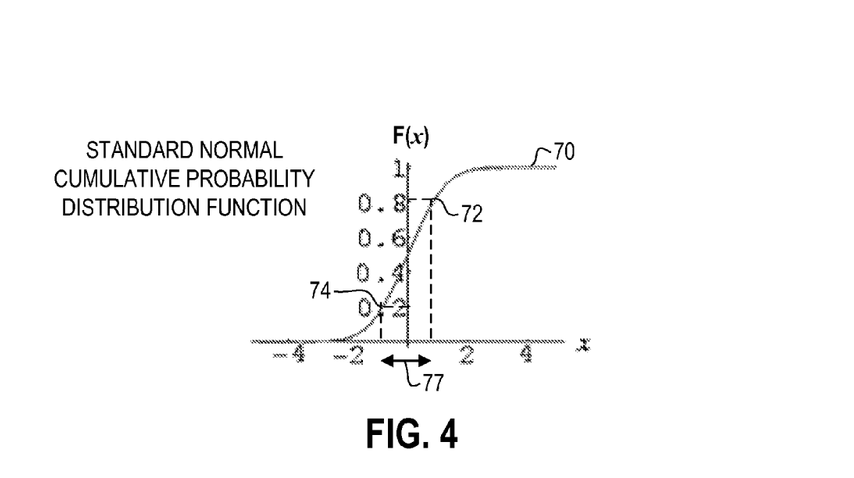
FIG. 4 illustrates the use of the standard normal distribution function for purposes of calculating a BNS score according to a representative embodiment of the present invention.

However, for most purposes herein it is assumed that the BNS score (as defined above) is used for feature scaling and that the function F is the standard Normal cumulative probability distribution function. FIG. 4 graphically illustrates the meaning of the BNS score under these assumptions. In FIG. 4, curve 70 is the standard Normal cumulative probability distribution function (i.e., for a Normal distribution with a mean of 0 and a standard deviation of 1). As is well known, standard Normal distribution function 70 is defined as:

$$SND(x) = \int_{-\infty}^{x} \frac{1}{\sqrt{2\pi}} e^{-t^2/2} \, \partial t = \frac{1}{2}\left[\text{erf}\left(\frac{x}{\sqrt{2}}\right) + 1\right],$$

and its values (and inverse values) can be determined from readily available lookup tables and calculators.

Point 72 on distribution function 70 represents a true positive rate of 80% (read from the y-axis), and its corresponding $F^{-1}(*)$ value (read from the x-axis) is 0.84. Point 74 on distribution function 70 represents a false positive rate of 20% (read from the y-axis), and its corresponding $F^{-1}(*)$ value (read from the x-axis) is −0.84. The interpretation of these two data points is that 80% of the training samples 12 classified into the subject category (i.e., pos of such samples) have a value of 1 for this particular feature, while only 20% of the training samples 12 that were not classified into the subject category (i.e., neg of such samples) have a value of 1 for this particular feature. This differential indicates that the present feature has some prediction ability for classifying items into the category, and the size of the differential provides a measure of that prediction ability. In the present case, a simple difference 77 is calculated between the two $F^{-1}(*)$ values, resulting in a BNS score for this feature of 1.68.

Because the inverse Normal cumulative probability distribution function goes to infinity at 0 or 1, tpr and fpr preferably are limited to fall within the range [0.0005, 0.9995]. Laplace smoothing is a more common method to avoid these extremes, but it damages the maximum likelihood estimate, and degrades the performance of BNS scaling by devaluing many valuable negative features in favor of very rare positive features. Alternately, and perhaps preferably, a half count is substituted if tp or fp is exactly zero; this is believed to work better for extremely large training sets. However, a fixed limit (e.g., 0.0005) permits use of a finite-size lookup table for the inverse Normal distribution function even where the number of training samples varies.

Figure 5:
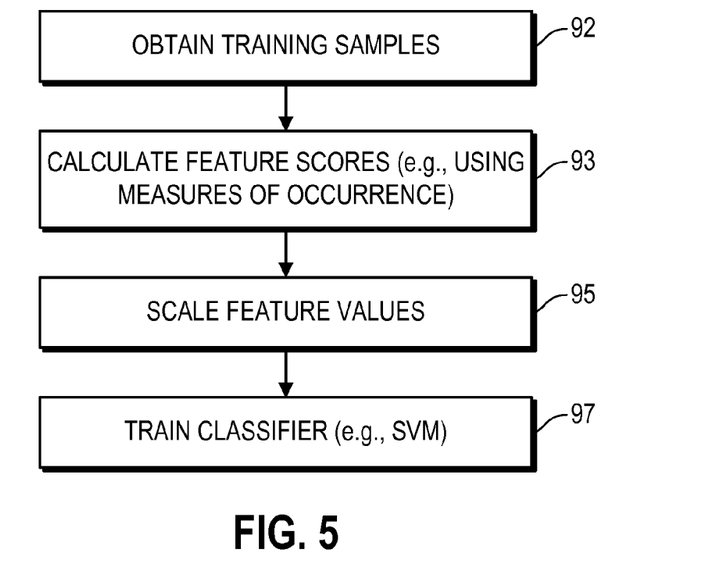
FIG. 5 is a flow diagram illustrating a process for training a classifier according to a representative embodiment of the present invention.

FIG. 5 is a flow diagram illustrating a process for training a classifier 18 according to a representative embodiment of the present invention.

Initially, in step 92 the training samples 12 are obtained. Preferably, the training samples 12 are represented by a set of values corresponding to a feature set 38 and include ground truth labels for at least some of the samples 12. As noted above, in certain embodiments the feature set 38 has been modified from an original feature set, e.g., by eliminating certain features.

In the preferred embodiments, the training samples 12 have been randomly selected from a group of items to be classified. However, particularly if the items to be classified are relatively static over time and across other groupings, the training samples instead can be selected from a completely separate group than the items that are ultimately to be classified, or from any combination of the same and separate groups.

Next, in step 93 a score is calculated for each of the training samples. In the preferred embodiments, the score comprises the BNS score referenced above. However, as also noted above, in other embodiments a different score is calculated.

In certain sub-embodiments, all features are removed that have received a feature score that is zero (or very close to zero based on a pre-defined threshold), because feature values multiplied by zero are always zero and therefore cannot help discriminate positives from negatives.

In step 95, the feature values for each of the training samples 12 are scaled based on the scores that were determined in step 93. Preferably, the potential range of values for each feature is set equal to, or proportionate to, the score that was determined in step 93. For example, if a feature is binary, meaning that it has possible values of either 0 or 1, the scaled value output from this step 95 is either 0 or the calculated score. More generally, a feature value preferably is scaled as follows:

$$V_{out} = \frac{A * S * (V_{in} - V_{min})}{(V_{max} - V_{min})}, \text{ where}$$

$V_{in}$ is the original value for the current feature and the current training sample,
S is the score determined in step 93 for the current feature,
A is arbitrary but constant across all features, typically 1,
$V_{max}$ is the maximum potential original value for the current feature, and
$V_{min}$ is the minimum potential original value for the current feature.

In alternate embodiments of the invention, nonlinear scaling is used, with the particular scaling function perfectly depending upon the manner in which the score was calculated in step 93 in relation to the underlying assumption regarding the probability distribution. In any event, the effect of this step 95 is to produce a set of output feature values where the dynamic range is greater for those features having greater prediction ability.

In step 97, the classifier is trained using the feature values as scaled in step 95. In the preferred embodiments of the invention, the classifier is a linear SVM. However, in alternate embodiments a nonlinear SVM, a Naïve Bayes or any other type of classifier is trained, preferably using a supervised or semi-supervised training technique.

It is noted that, generally speaking, a SVM refers to any one of a set of related supervised learning techniques in which an "optimal" hyperplane is used to separate different classifications, where the margin (meaning the minimal distance from the separating hyperplane to the closest data points) is maximal. One feature of this approach is that the solution is based only on those data points that are at or near the margin. These points are called support vectors. The linear SVM can be extended to a nonlinear SVM by first transforming the problem into a feature space using a set of nonlinear basis functions.

Figure 6:
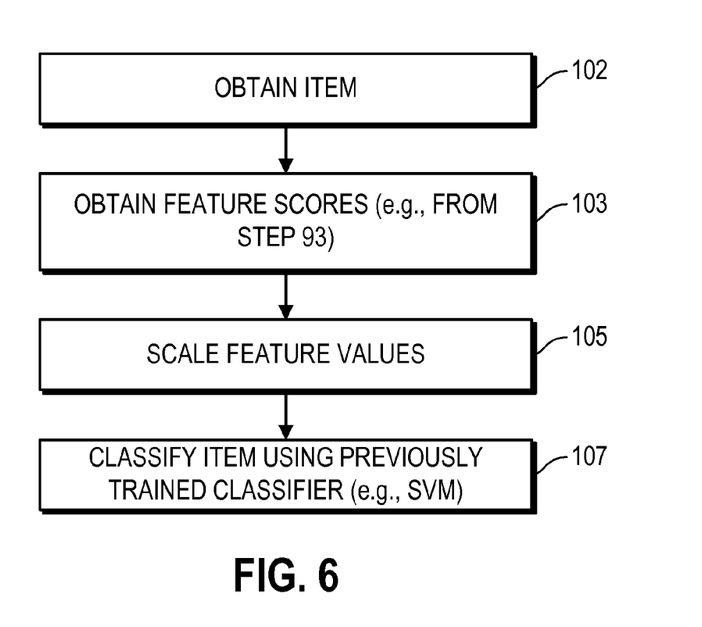
FIG. 6 is a flow diagram illustrating a process for classifying an item according to a representative embodiment of the present invention.

FIG. 6 is a flow diagram illustrating a process for classifying an item according to a representative embodiment of the present invention. As will become apparent below, several of the steps of the preferred process for classifying an item mirror those described above for training the classifier 18.

Initially, in step 102 an item 22 to be classified is obtained. As with the training samples 12, the item 22 preferably is represented by a set of values corresponding to a feature set 38, although in this case there generally is of course no pre-identified classification label. In certain embodiments, the feature set 38 has been modified from an original feature set, e.g., by eliminating certain features.

In step 103, a score is obtained for each feature having a corresponding feature value in item 22. In the preferred embodiments, the scores are obtained of the training step 93, discussed above. However, in alternate embodiments the scores were generated using data other than, or in addition to, the training samples used in step 93.

In step 105, the feature values for the item 22 are scaled based on the scores that were obtained in step 93. This step, as well as the considerations pertaining to it, preferably are similar to step 95, discussed above. More preferably, the identical scaling that was performed in the training step 95 (used for the training of the classifier that will be used in step 107) is performed in this step 105. In certain sub-embodiments, if an item to be classified 22 has a feature value that fall outside the previously known range [$V_{min}$, $V_{max}$], then its value is clipped to fall within this range before proceeding with the scaling.

Finally, in step 107 the classifier trained in step 97 is used to classify the current item 22 based on the scaled feature set values for item 22. As noted above, the classifier preferably is a linear SVM classifier.

It is noted that one application of the present invention is in conjunction with the techniques described in commonly assigned U.S. patent application to the present inventor, filed on or about the same date as the present application, and titled "Classification Using Enhanced Feature Sets" which application is incorporated by reference herein as though set forth herein in full. For example, feature scaling according to the present invention preferably is performed on the enhanced feature sets provided by the "Classification Using Enhanced Feature Sets" application.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of automated machine-learning classification, comprising:
    establishing, within a computer, an original feature set, each feature of the original feature set having a predictive value, the predictive value of some features being uncertain for characterizing expected input items during classification thereof;
    selecting with the computer a feature set, the feature set being a subset of the original feature set;
    obtaining to the computer a number of training items having values for a plurality of different features in the feature set;
    calculating with the computer scores for the different features of the feature set using a scoring technique, the score for a given feature being a measure of prediction ability for the given feature and calculated as $S=|aF^{-1}(tpr)-bF^{-1}(fpr)|$, where S is the score, tpr is the true positive rate of the given feature equal to a number of positive training cases containing a subject feature divided by a number of positive training cases, fpr is the false positive rate of the given feature equal to a number of negative training cases containing the subject feature divided by a number of negative training cases, |*| is an absolute value, $F^{-}(*)$ is an inverse of an assumed probability distribution function, and a and b are constants;
    scaling the values for the features of the feature set with the computer according to the scores for said features as adjusted feature values;
    generating a classifier with the computer;
    training the classifier using the adjusted feature values for the features of the feature set;
    scaling the values for the features in the feature set of an input item with the computer according to the scores as adjusted feature values of the input item; and
    classifying an input item using the computer and the adjusted feature values for the input item into the previously trained classifier.

2. A method according to claim 1, wherein the given score is a measure of separation between the plurality of different occurrence metrics, relative to an assumed probability distribution.

3. A method according to claim 1, wherein the plurality of different occurrence metrics include a true positive rate for the given feature and a false positive rate for the given feature.

4. A method according to claim 3, wherein the score for the given feature is a measure of separation between the true positive rate and the false positive rate.

5. A method according to claim 4, wherein the measure of separation between the true positive rate and the false positive rate is calculated relative to an assumed probability distribution.

6. A method according to claim 5, wherein the assumed probability distribution comprises a normal cumulative probability distribution function.

7. A method according to claim 1, wherein the values for the features are scaled such that ranges of values for the different features are proportionate to the scores corresponding to said different features.

8. A method according to claim 1, further comprising eliminating at least one feature from the original feature set in selecting the feature set using a second scoring technique different than the scoring technique used for calculating scores for the different features.

9. A method of automated machine learning classification, comprising:
obtaining, to a first pre-processing portion of a computer, a training item having values for a plurality of different features in a feature set;
calculating with a scoring technique implemented by the first pre-processing portion of the computer scores for the different features, the score for a given feature being calculated as $S=|aF^{-1}(tpr)-bF^{-1}(fpr)|$, where S is the score, tpr is the true positive rate of the given feature equal to a number of positive training cases containing a subject feature divided by a number of positive training cases, fpr is the false positive rate of the given feature equal to a number of negative training cases containing the subject feature divided by a number of negative training cases, $|*|$ is an absolute value, $F^{-1}(*)$ is an inverse of an assumed probability distribution function, and a and b are constants;
scaling the values for the features with the first pre-processing portion of the computer according to the scores for said features, thereby obtaining adjusted feature set values for the training item;
training a supervised machine-learning classifier using the adjusted feature set values from the first pre-processing portion of the computer;
obtaining to a second pre-processing portion of a computer an unlabeled item having values for the plurality of different features in the feature set;
calculating with the scoring technique implemented by the second pre-processing portion of the computer, further scores for the different features, the further score for a given feature being calculated as S;
scaling the adjusted feature set values using the second pre-processing portion of the computer according to the further scores for said features, thereby obtaining modified feature set values for the unlabeled item;
scaling the values for the features in the feature set of an input item with the computer according to the scores as adjusted feature values of the input item; and
classifying the unlabeled item by inputting the modified feature set values into the supervised machine-learning classifier.

10. A method according to claim 9, wherein the score and the further score for the given feature were calculated as a function of a plurality of different occurrence metrics pertaining to the given feature.

11. A method according to claim 10, wherein the occurrence metrics include a count of proper classification based on the given feature and a count of improper classification based on the given feature.

12. A method according to claim 10, wherein the given score and the given further score are a measure of separation between the plurality of occurrence metrics, relative to an assumed probability distribution.

13. A method according to claim 9, wherein the supervised machine-learning classifier is a Support Vector Machine.

14. A method according to claim 9, further comprising eliminating at least one feature from the feature set prior to classifying the unlabeled item.

15. A non-transitory computer-readable medium storing computer-executable process steps for machine-learning classification, said process steps comprising:
establishing an original feature set, each feature of the original feature set having a predictive value, the predictive value of some features being uncertain for characterizing expected input items during classification thereof;
selecting a feature set, the feature set being a subset of the original feature set;
obtaining a number of training items having values for a plurality of different features in the feature set;
calculating with the computer scores for the different features of the feature set using a scoring technique, the score for a given feature being a measure of prediction ability for the given feature and calculated as $S=|aF-1(tpr)-bF-1(fpr)|$, where S is the score, tpr is the true positive rate of the given feature equal to a number of positive training cases containing a subject feature divided by a number of positive training cases, fpr is the false positive rate of the given feature equal to a number of negative training cases containing the subject feature divided by a number of negative training cases, $|*|$ is an absolute value, $F-1(*)$ is an inverse of an assumed probability distribution function, and a and b are constants;
scaling the values for the features of the feature set according to the scores for said features as adjusted feature values;
generating a classifier;
training the classifier using the adjusted feature values of the feature set;
scaling the values for the features in the feature set of an input item with the computer according to the scores as adjusted feature values of the input item; and
classifying an input item using the adjusted feature values for the input item into the previously trained classifier.

16. A non-transitory computer-readable medium according to claim 15, wherein the given score is a measure of separation between the plurality of occurrence metrics, relative to an assumed probability distribution.

17. A non-transitory computer-readable medium according to claim 15, wherein the plurality of occurrence metrics include a true positive rate for the given feature and a false positive rate for the given feature.

18. A non-transitory computer-readable medium according to claim 15, wherein at least one feature is eliminated from the original feature set in selecting the feature set using a second scoring technique different than the scoring technique used for calculating scores for the different features.

* * * * *

UNITED STATES PATENT AND TRADEMARK OFFICE
CERTIFICATE OF CORRECTION

PATENT NO. : 8,885,928 B2  
APPLICATION NO. : 11/552968  
DATED : November 11, 2014  
INVENTOR(S) : George Henry Forman It is certified that error appears in the above-identified patent and that said Letters Patent is hereby corrected as shown below:

In the Claims

In column 10, line 33, in Claim 1, delete "$F^-(*)$" and insert -- $F^{-1}(*)$ --, therefor.

In column 12, line 24, in Claim 15, delete "F-1" and insert -- $F^{-1}$ --, therefor.

In column 12, line 24, in Claim 15, delete "F-1" and insert -- $F^{-1}$ --, therefor.

In column 12, line 31 approx., in Claim 15, delete "F-1(*)" and insert -- $F^{-1}(*)$ --, therefor.

Signed and Sealed this
Twenty-eighth Day of April, 2015

Michelle K. Lee
*Director of the United States Patent and Trademark Office*